No. 789,667. Patented May 9, 1905.

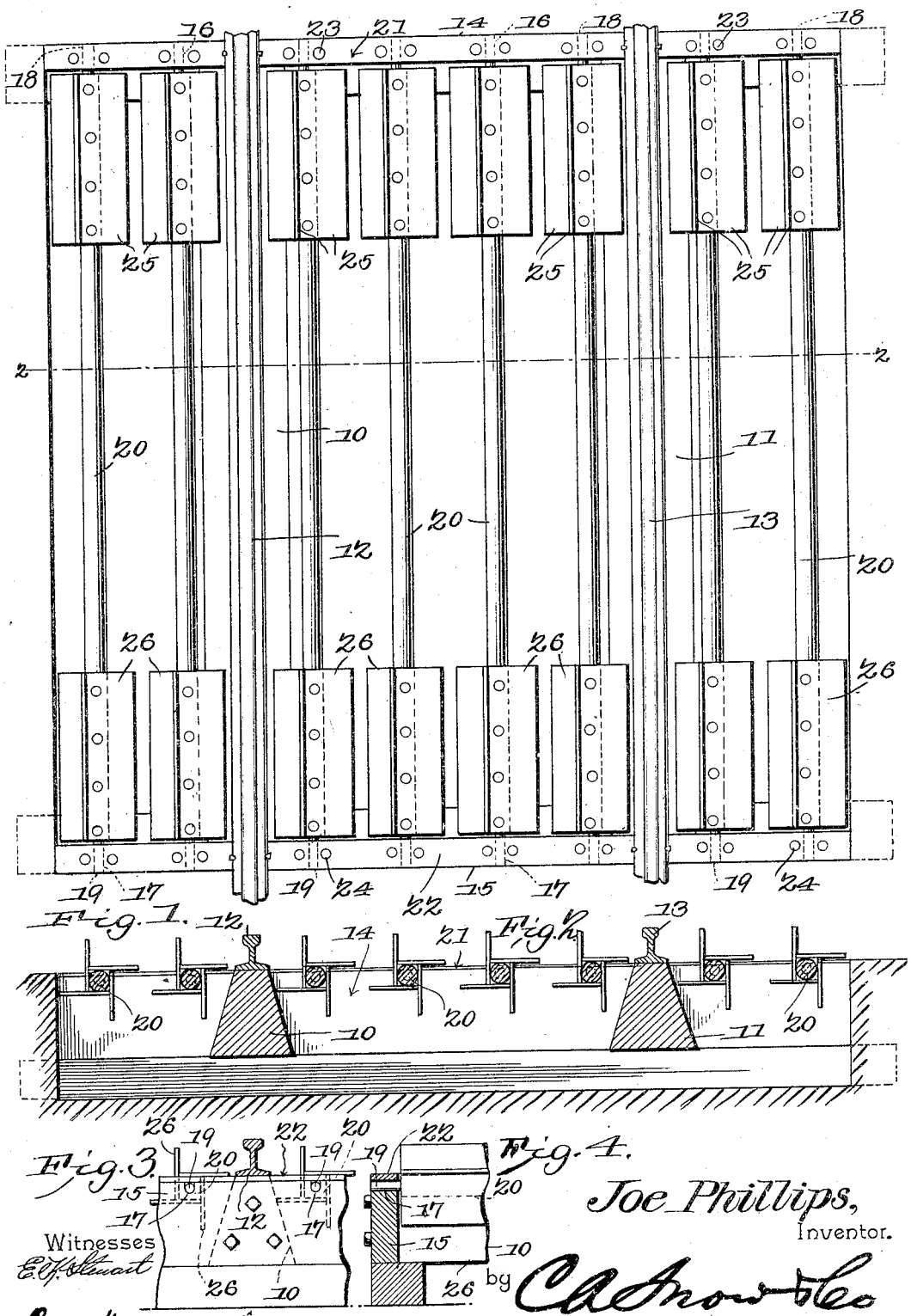

UNITED STATES PATENT OFFICE.

JOSEPH PHILLIPS, OF DODDRIDGE, ARKANSAS.

CATTLE-GUARD.

SPECIFICATION forming part of Letters Patent No. 789,667, dated May 9, 1905.

Application filed February 3, 1905. Serial No. 244,040.

*To all whom it may concern:*

Be it known that I, JOSEPH PHILLIPS, a citizen of the United States, residing at Doddridge, in the county of Miller and State of Arkansas, have invented a new and useful Cattle-Guard, of which the following is a specification.

This invention relates to cattle-guards employed for preventing cattle and other animals from passing from roadways to the railway-tracks or from or into an inclosure through which a railway passes, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like characters, is illustrated the preferred embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a plan view. Fig. 2 is a transverse section on the line 2 2 of Fig. 1. Figs. 3 and 4 are details illustrating the construction of portions of the device.

The improved device comprises spaced string-ties 10 11 for supporting the railway-rails 12 13 and connected at the ends by transverse members 14 15. The parts 10 11 and 14 15 thus form an oblong frame for supporting the rails and the parts forming the guard. Formed at suitable intervals transversely of the end members 14 15 are bearings 16 17, and mounted for rotation in these bearings by journals 18 19 are rollers 20. Covering-plates 21 22 are secured to the upper faces of the members 14 15, as by screws or bolts 23 24, and extending over the journals of the rollers retain them in position. The rollers are square for a distance at each end, and attached to these square portions are laterally-extending wings 25 26, the wings being so arranged that their outer edges are uniformly spaced from the centers of the rollers, as represented in Fig. 2. The rollers being free to revolve, a slight pressure only upon the wings is necessary to rotate them. Hence if the rollers be so spaced that the wing members entirely fill the space between the rails 12 13 an animal cannot pass without placing its foot upon one of the wings, which turning beneath the foot will at once turn the animal back and effectually prevent it from passing.

If under unusual conditions an animal should succeed in passing one set of the rotatable wings, it would be checked by the next set.

The device is simple in construction, can be cheaply and strongly manufactured of wood, except the wings 25 26 and plates 21 22, and is adapted for any locality where devices of this kind are required.

Having thus described the invention, what is claimed is—

1. In a cattle-guard, spaced string-ties for supporting the railway-rails connected at the ends by transverse members, a plurality of rollers spaced apart and mounted for rotation upon said transverse members, and laterally-extending wings connected to said rollers adjacent to said transverse members.

2. In a cattle-guard, spaced string-ties for supporting the railway-rails connected at the ends by transverse members having spaced transverse bearings, rollers having journals rotatively engaging said bearings and provided with lateral wings adjacent to said transverse members, and plates disposed upon said transverse end members and forming closures to said bearings.

In testimony that I claim the foregoing as my own I have hereto affixed my signature in the presence of two witnesses.

JOE PHILLIPS.

Witnesses:
 ZEAK POOL,
 HENRY ATCHISON.